United States Patent
Syal et al.

(10) Patent No.: US 12,468,999 B2
(45) Date of Patent: Nov. 11, 2025

(54) VIRTUAL WAREHOUSE ANALYSIS AND CONFIGURATION PLANNING SYSTEM

(71) Applicant: Capital One Services, LLC, McLean, VA (US)

(72) Inventors: Rahul Syal, New York, NY (US); Tyler Fearns, Richmond, VA (US); Chris Sylvia, Boston, MA (US); Justin Bougher, Boston, MA (US); Kishore Kolanu, Glen Allen, VA (US); David Ellis, San Diego, CA (US); Brenton Mallen, Richmond, VA (US); Rohan Khopkar, Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 209 days.

(21) Appl. No.: 18/213,670

(22) Filed: Jun. 23, 2023

(65) Prior Publication Data
US 2024/0428169 A1    Dec. 26, 2024

(51) Int. Cl.
*G06Q 10/0639* (2023.01)
*G06N 3/084* (2023.01)

(52) U.S. Cl.
CPC ......... *G06Q 10/0639* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 10,748,157 B1 * | 8/2020 | Indyk | G06Q 30/016 |
| 11,308,100 B2 * | 4/2022 | Saxena | G06F 16/285 |
| 11,442,669 B1 * | 9/2022 | Frandzel | G06F 3/0653 |

(Continued)

OTHER PUBLICATIONS

Zykov, Sergey V., et al. "Applicative-based automatic configuration management for virtual machines." Procedia Computer Science 126 (2018): 1771-1778 (Year: 2018).*

(Continued)

*Primary Examiner* — Darlene Garcia-Guerra
(74) *Attorney, Agent, or Firm* — Banner & Witcoff, Ltd.

(57) ABSTRACT

Methods, systems, and apparatuses for using machine learning to simulate changes to virtual warehouse configurations without access to data stored by corresponding virtual warehouses are described herein. A computing device may receive first performance metrics of one or more first queries executed by one or more first virtual warehouses. The computing device may then generate a trained machine learning model to simulate operating parameter changes and predict virtual warehouse query performance metrics. The computing device may then provide performance metrics for one or more second virtual warehouses to the trained machine learning model. Output from the trained machine learning model may comprise performance metric predictions corresponding to a given configuration of a virtual warehouse. Predicted costs associated with those performance metric predictions may be output and, based on user input, the operating parameter of the at least one of the one or more second virtual warehouses may be modified.

20 Claims, 7 Drawing Sheets

(56) References Cited

U.S. PATENT DOCUMENTS

| | | | | |
|---|---|---|---|---|
| 11,693,857 | B1* | 7/2023 | Jindal | G06F 16/24545 707/720 |
| 11,914,595 | B2* | 2/2024 | Kandukuri | G06F 16/24545 |
| 11,924,292 | B2* | 3/2024 | Dickens | H04L 67/34 |
| 12,026,140 | B1* | 7/2024 | Bunescu | G06F 16/2228 |
| 2009/0055270 | A1* | 2/2009 | Magdon-Ismail | G06F 16/957 705/14.27 |
| 2011/0010360 | A1* | 1/2011 | Ayoub | G06F 16/24544 707/719 |
| 2017/0212930 | A1* | 7/2017 | Carter | G06F 16/9024 |
| 2019/0164033 | A1* | 5/2019 | Khapali | G06N 3/084 |
| 2020/0372408 | A1* | 11/2020 | Rossi | G06F 9/3885 |
| 2021/0357702 | A1* | 11/2021 | Jaw | G06V 30/41 |
| 2022/0138223 | A1* | 5/2022 | Sonner | G06F 11/2097 707/620 |
| 2023/0014937 | A1 | 1/2023 | Kandukuri et al. | |
| 2023/0105019 | A1* | 4/2023 | Ghosh | G06Q 10/083 705/28 |
| 2023/0115127 | A1* | 4/2023 | Ghosh | G06F 3/04842 345/633 |
| 2023/0161792 | A1* | 5/2023 | Pandis | G06F 16/24542 707/718 |
| 2024/0126607 | A1* | 4/2024 | Royal | G06F 11/3075 |
| 2024/0143175 | A1* | 5/2024 | Dagan | G06F 3/061 |
| 2024/0221039 | A1* | 7/2024 | Burger | G06Q 30/0629 |

OTHER PUBLICATIONS

Dotoli, Mariagrazia, et al. "An integrated approach for warehouse analysis and optimization: A case study." Computers in Industry 70 (2015): 56-69 (Year: 2015).*

Landers, Thomas L., et al. "The virtual warehousing concept." Transportation Research Part E: Logistics and Transportation Review 36.2 (2000): 115-126 (Year: 2000).*

Mozafari Barzan et al. "Making Data Clouds Smarter at Keebo: Automated Warehouse Optimization using Data Learning" Proceedings of teh 23rd International Middleware Conference Doctoral Symposium, ACMPUB27, New York, NY, USA, Jun. 4, 2023, pp. 239-251, XP059055090, Doi: 10.1145/3555041.3589681 ISBN: 978-1-4503-9942-5.

Woodward Niall: "3 ways to configure Snowflake warehouse sizes in dbt", Jan. 18, 2023, pp. 1-9, XP093225678, https://select.dev/posts/configuring-snowflake-warehouse-sizes-in-dbt.

Zhou Xuanhe et al. "Database Meets Artificial Intelligence: A Survey" IEEE Transactions on Knowlede and Data Engineering, May 14, 2020, pp. 1-20, XP055811550, US ISSN: 1041-4347, DOI: 10.1109/TKDE.2020.2994641.

Oct. 31, 2024—(EP( Search Report—App No. 24181892.1.

Westbrook, Wareen, "4 Steps to Optimizing Cloud Spend Management with Snowflake," Dec. 20, 2022, Inside the Data Cloud, retrieved from https://www.snowflake.com/blog/four-steps-optimizing-cloud-spend-management/, pp. 1-5.

Franking, Matt, "Every Snowflake is Unique: Forecasting a Highly Variable Business," Dec. 21, 2021, Inside the Data Cloud, retrieved from, https://www.snowflake.com/blog/every-snowflake-is-unique-forecasting-a-highly-variable-business/, pp. 1-6.

"Fully Automated Snowflake Optimization," Keebo, retrieved from, https://keebo.ai/snowflake-optimization/, retrived on Jun. 23, 2023, pp. 1-5.

Han, Chenxia, et al., "Cloud Database Tuning with Reinforcement Learning," Department of Computer Science and Engineering, The Chinese University of Hong Kong, Dec. 14, 2020, pp. 1-8.

Ai, Xusheng. (2021). "A Tiered Recommender System for Cost-Effective Cloud Instance Selection," University of the Pacific, Thesis. https://scholarlycommons.pacific.edu/uop_etds/3764.

"Monitor Snowflake with Datadog," DATADOG, retrieved from, https://www.datadoghq.com/dg/monitor/snowflake/?utm_source=advertisement&utm_medium=search&utm_campaign=dg-bing-infrana-snowflake&utm_keyword=analyze%20snowflake&utm_matchtype=p&utm_campaignid=428329236&utm_adgroupid=1310618230986334&msclkid=167fc239325f146a85c1a65c2a08b3a5, retrived on Jun. 23, 2023, pp. 1-10.

"Multi-Cluster Warehouses," Snowflake Documentation, copyright Snowflake, Inc., retrieved from, https://docs.snowflake.com/en/user-guide/warehouses-multicluster, Jun. 23, 2023,.

* cited by examiner

| STATUS QUO | OPTION 1 | OPTION 2 |
|---|---|---|
| Virtual Warehouse 1<br>- Large Size<br>- Turns off at 6 PM<br>- Avg. Query Time: 20s<br><br>Virtual Warehouse 2<br>- Small Size<br>- 24/7<br>- Avg. Query Time: 1m<br><br>TOTAL COST:<br>$30/hr. | Virtual Warehouse 1<br>- Medium Size<br>- Turns off at 6 PM<br>- Avg. Query Time: 25s<br><br>Virtual Warehouse 2<br>- Small Size<br>- Turns off at 6 PM<br>- Avg. Query Time: 1m<br><br>TOTAL COST:<br>$25/hr. | Virtual Warehouse 1<br>- XL Size<br>- Turns off at 6 PM<br>- Avg. Query Time: 10s<br><br>Virtual Warehouse 2<br>- Small Size<br>- 24/7<br>- Avg. Query Time: 1m<br><br>TOTAL COST:<br>$40/hr. |
| SELECT | SELECT | SELECT |

| Query ID | Time Elapsed | Virtual Warehouse ID | Virtual Warehouse Size |
|---|---|---|---|
| 1 | 20s | VW2 | M |
| 2 | 15s | VW1 | L |
| 3 | 30s | VW2 | M |

FIG. 7A

| Query ID | Time Elapsed | Virtual Warehouse ID | Virtual Warehouse Size |
|---|---|---|---|
| 1 | 30s | VW2 | S |
| 2 | 15s | VW1 | L |
| 3 | 60s | VW2 | S |

FIG. 7B

VIRTUAL WAREHOUSE ANALYSIS AND CONFIGURATION PLANNING SYSTEM

FIELD OF USE

Aspects of the disclosure relate generally to data storage and retrieval. More specifically, aspects of the disclosure relate to using machine learning to simulate changes to operating parameters of virtual warehouses.

BACKGROUND

The Snowflake architecture, produced by Snowflake Inc. of San Mateo, CA, permits organizations to logically separate but natively integrate storage, computing, and services. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. Snowflake and similar "data warehouse as a service" platforms may thereby allow users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

One way in which the Snowflake architecture improves conventional query execution is that Snowflake allows virtual warehouses to be created, modified, and destroyed as desired. To preserve computing resources (and due to the cost implications of different warehouse sizes), the different virtual warehouses may be configured with different computing resources. Commonly, such virtual warehouses may be referred to as "extra-large," "large," "medium," or "small" (that is, the virtual warehouses may be in "t-shirt sizes"), referring to a different relative quantity of computing resources available to a virtual warehouse. For example, a virtual warehouse for large, significant, and/or time-sensitive queries may be an "extra-large" virtual warehouse (and have a significant quantity of computing resources), whereas a virtual warehouse for relatively smaller, less significant, and/or more time-insensitive queries may be a "small" virtual warehouse (and have a relatively small quantity of computing resources). The quantity of computing resources might be subdivided into different "nodes," such that, for example, a "large" virtual warehouse may comprise eight nodes, whereas a "small" virtual warehouse may comprise two nodes.

It can be difficult to estimate how virtual warehouses should be configured, particularly in circumstances where the actual data accessible via those virtual warehouses cannot be analyzed. For example, it can be difficult to predict how switching a virtual warehouse from a "large" to a "medium" size might change query speed and overall organizational costs, especially in circumstances where the actual data available to those virtual warehouses is not accessible and/or where the query text provided to that virtual warehouse is not accessible (e.g., due to privacy reasons). As a result, many users of the Snowflake platform often guess the appropriate configuration of various virtual warehouses, only bothering to tweak those configurations in circumstances where queries are extremely slow and/or extremely costly. This can result in significant financial and computational waste over time.

Aspects described herein may address these and other problems, and generally improve the quality, efficiency, and speed of the management of virtual warehouses as those workspaces are tasked with queries.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to using machine learning techniques to simulate changes to virtual warehouse configurations, even in circumstances where data and/or query text is not available. In this manner, the aspects described herein provide a system that can recommend configuration changes to virtual warehouses without analyzing the (often private and/or sensitive) data available to those virtual warehouses. To be able to make such recommendations, a trained machine learning model may be trained to predict the effect of operating parameter changes on virtual warehouses using the performance metrics of queries executed with respect to other virtual warehouses. In this way, the machine learning model might be trained using simulated and/or non-sensitive data such that, when provided performance metrics for queries associated with virtual warehouses that access sensitive and/or private data, the machine learning model can recommend virtual warehouse configuration changes without accessing (and thereby risking the security of) the sensitive and/or private data. Output from the trained machine learning model (e.g., different performance metric predictions for different changes to the configuration of one or more virtual warehouses) may be displayed in a user interface along with predicted costs corresponding to those predictions. In this way, a user might not only be provided predictions as to the efficacy of certain configuration changes, but also might better understand the cost implications of such changes. Then, based on user selection of one or more of those performance metric predictions, operating parameters of one or more virtual warehouses may be modified.

For example, a computing device may receive first performance metrics of one or more first queries executed by one or more first virtual warehouses. Each of the one or more virtual warehouses comprises a respective set of computing resources configured to execute one or more queries with respect to at least a portion of a plurality of data warehouses, collect results from the one or more queries, and provide access to the collected results. The computing device may generate a trained machine learning model by training, using the first performance metrics, a machine learning model to simulate operating parameter changes and predict virtual warehouse query performance metrics. To perform such training, the computing device may modify, based on the first performance metrics, one or more weights of an artificial neural network. The computing device may then receive, as output from the trained machine learning model, data indicating first performance metric predictions corresponding to a first configuration for an operating parameter of at least one of the one or more second virtual warehouses and second performance metric predictions corresponding to a second configuration for the operating parameter of the at least one of the one or more second virtual warehouses. The computing device may then cause display, in a user interface, of a first predicted cost based on the first performance metric predictions and associated with the first configuration and a second predicted cost based on the second performance metric predictions and associated with the second configuration. The computing device may then receive, via the user interface, a selection of an option corresponding to the first configuration and modify, based on the selection, the operating parameter of the at least one of the one or more second virtual warehouses.

The modification to the operating parameter of the at least one of the one or more second virtual warehouses may be performed in a variety of ways. For example, the computing device may modify a size of the one or more second virtual warehouses, a schedule of the one or more second virtual warehouses, a minimum number of clusters of the one or more second virtual warehouses, a maximum number of clusters of the one or more second virtual warehouses, an auto suspend time of the one or more second virtual warehouses, a statement timeout of the one or more second virtual warehouses, a query acceleration setting of the one or more second virtual warehouses, a setting that controls whether the one or more second virtual warehouses are optimized for an application programming interface (API) such (e.g., SnowPark), and/or may prevent the one or more second virtual warehouses from executing a query. Additionally and/or alternately, the computing device may instantiate, based on the selection, an additional virtual warehouse. In this manner, virtually any possible configuration changes to virtual warehouses are within the scope of the disclosure herein.

The trained machine learning model may be trained using a variety of different sets of data. In addition to and/or alternative to the first performance metrics of the one or more first queries executed by the one or more first virtual warehouses, the machine learning model may be trained based on third performance metrics of one or more third queries executed by the one or more second virtual warehouses. In this manner, the trained machine learning model might have been trained using performance metrics for queries associated with synthetic, non-private, and/or third-party data, but might also be trained with performance metrics for queries associated with the virtual warehouses that might be changed based on output of the trained machine learning model (that is, to the extent that such performance metrics are available). Additionally and/or alternatively, the trained machine learning model might be trained based on user satisfaction with past changes to virtual warehouses. For example, the computing device may receive, via the user interface and after the computing device modifies the operating parameters, user feedback and train the machine learning model based on the user feedback.

The output from the trained machine learning model may be further used to route queries to one or more virtual warehouses. For example, the computing device may receive, after the computing device modifies the operating parameters, an indication of a requested query. In response, the computing device may output a recommended virtual warehouse of the one or more second virtual warehouses for executing the requested query.

The permutations of different configurations output by the virtual warehouses may be based on user input. For example, a user might indicate that they are interested in changing the size of a virtual warehouse, and such an indication may be provided as input (along with other input) to the trained machine learning model, which may in turn output various performance metric predictions for different sizes of virtual warehouse. As another example, the computing device may receive, via the user interface, a selection of a first size, and the second performance metrics may comprise an indication of the first size.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 6 depicts an illustrative user interface indicating options for changes to the configuration of virtual warehouses.

FIG. 7A depicts illustrative query performance metrics.

FIG. 7B depicts an illustrative performance metrics prediction that might be output from a trained machine learning model.

DETAILED DESCRIPTION

Figure 1:
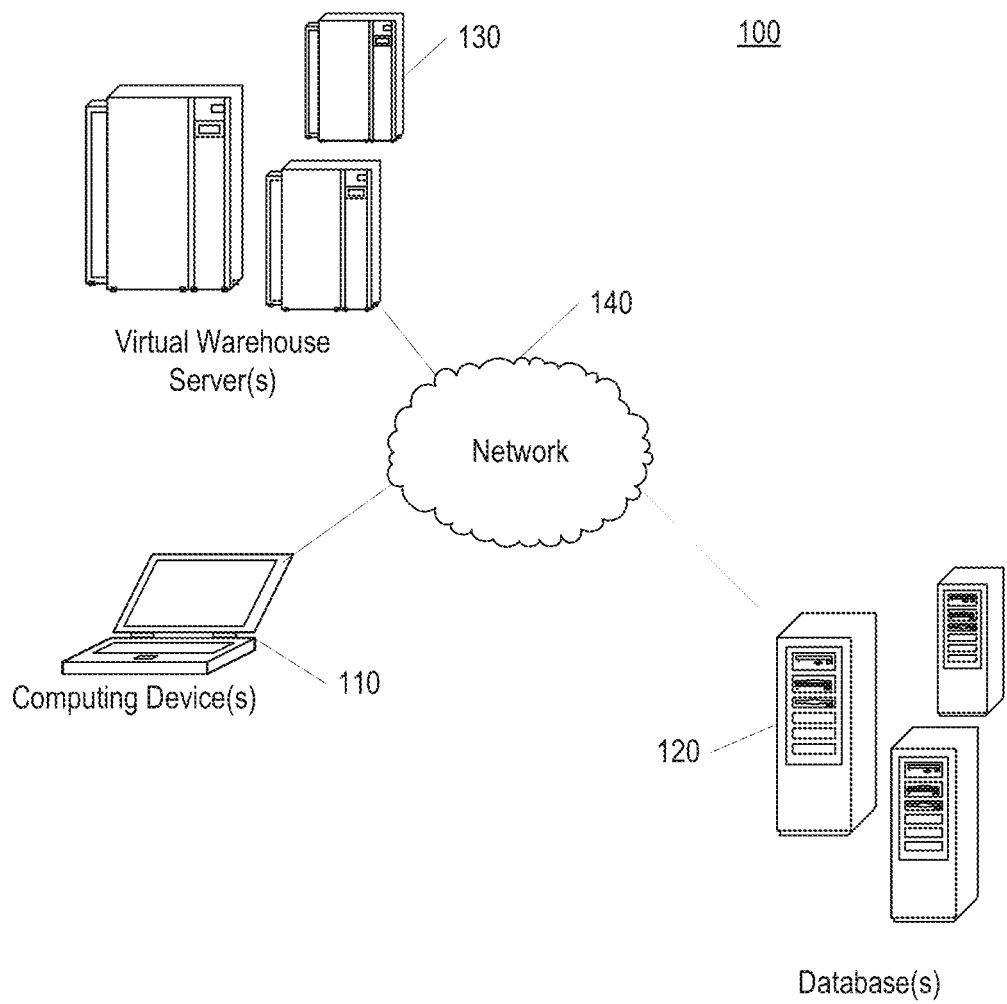
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to simulating changes to virtual warehouse configurations without access to data stored by corresponding virtual warehouses. Assume, for example, that a third-party service provider wishes to help a bank determine how to best configure its virtual warehouses. In such a circumstance, the third-party service provider might not be able to access the actual data used by the bank: after all, such data might comprise sensitive personal information, credit card numbers, and the like. Along those lines, in many circumstances, the third-party service provider might not even be able to access query text (such as the actual text provided as part of a query to virtual warehouses). Aspects described herein describe a process whereby the third-party service provider might nonetheless be able to provide recommendations for configuration changes to the bank's virtual warehouses based on analysis, using a trained machine learning model, of performance metrics generated based on queries to the bank's virtual warehouses. In this manner, various configuration parameters of the bank's virtual warehouses—for example, their sizes, operating schedules, the quantity of virtual warehouses, and the like—might be modified in a manner that does not risk the security of the bank's data.

The present disclosure is significantly different than conventional optimization processes at least in that it operates in view of the particularities and unique needs of virtual warehouses. The present disclosure is far more than a mere instruction to decide the optimal size of a data warehouse: rather, the present disclosure uses machine learning to train on the activity of first virtual warehouses to recommend changes to second virtual warehouses without potentially exposing valuable data accessible via the second virtual warehouses. In this manner, the process described herein is not only unique to the eccentricities of virtual warehouses (which optimize quite differently than conventional databases and which have cost implications different than conventional databases), but also operates in view of security concerns (such as the possibility that, during optimization, the actual data and query text accessible via the virtual warehouses might not be accessible/analyzable).

The present disclosure also improves the functioning of computers by improving the manner in which computing resources are allocated, deployed, and otherwise used. Virtual warehouses provide an improvement to conventional query systems, but their misconfiguration and misuse can result in the waste of computing resources. As such, improvements to the manner in which queries are received by virtual warehouses may make those virtual warehouses more efficient. For example, by properly sizing a virtual warehouse based on output from the trained machine learning model described herein, the virtual warehouse can be configured in a manner which, e.g., does not unnecessarily waste computing resources and which does not cause queries to take an undesirably long time to execute.

The present disclosure is also fundamentally rooted in computing devices and, in particular, an environment with virtual warehouses. Presently, virtual-warehouse-as-a-service platform architectures (e.g., Snowflake's architecture) are unique in that they allow for different configurations for different compute environments (e.g., different virtual warehouses). In contrast, other database systems rely on monolithic systems to handle all enterprise needs. It is precisely this flexibility of these virtual-warehouse-as-a-service platform architectures that is addressed by the improvements discussed herein.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 may be located in a first location (e.g., the offices of a corporation), and the virtual warehouse servers 130 and/or the data warehouses 120 may be located in a variety of locations (e.g., distributed in a redundant manner across the globe). This may protect business resources: for example, if the Internet goes down in a first location, the distribution and redundancy of various devices may allow a business to continue operating despite the outage.

The virtual warehouse servers 130 may be all or portions of a virtual-warehouse-as-a-service system. One example of such a virtual-warehouse-as-a-service system is the Snowflake architecture. With that said, any type of virtual-warehouse-as-a-service system may be implemented using the present disclosure. For example, the computing devices 110 and/or the data warehouses 120 may be managed by an organization. In contrast, the virtual warehouse servers 130 may be managed by a different entity, such as Snowflake Inc. In this manner, a third party (e.g., Snowflake) may provide, as a service, virtual warehouses which may operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse may be a single database, a collection of databases, or the like. A data warehouse may be structured and/or unstructured, such that, for example, a data warehouse may comprise a data lake. A data warehouse may store data in a variety of formats and in a variety of manners. For example, a data warehouse may comprise textual data in a table, image data as stored in various file system folders, and the like.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
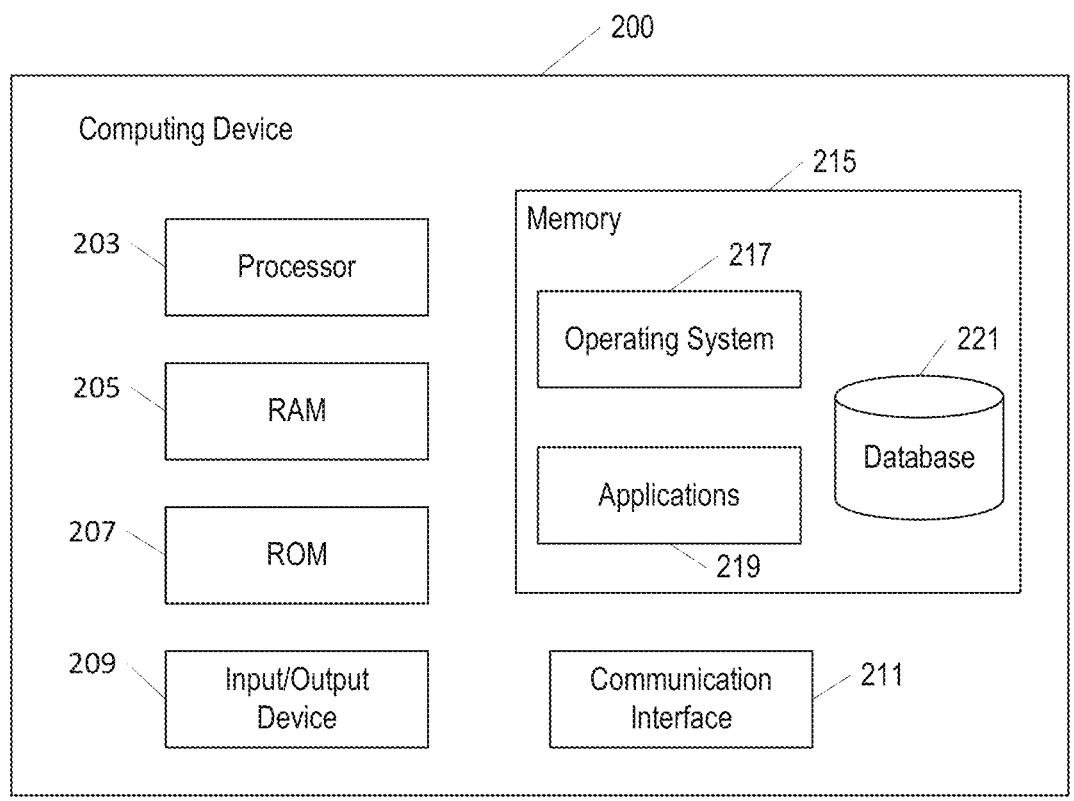
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
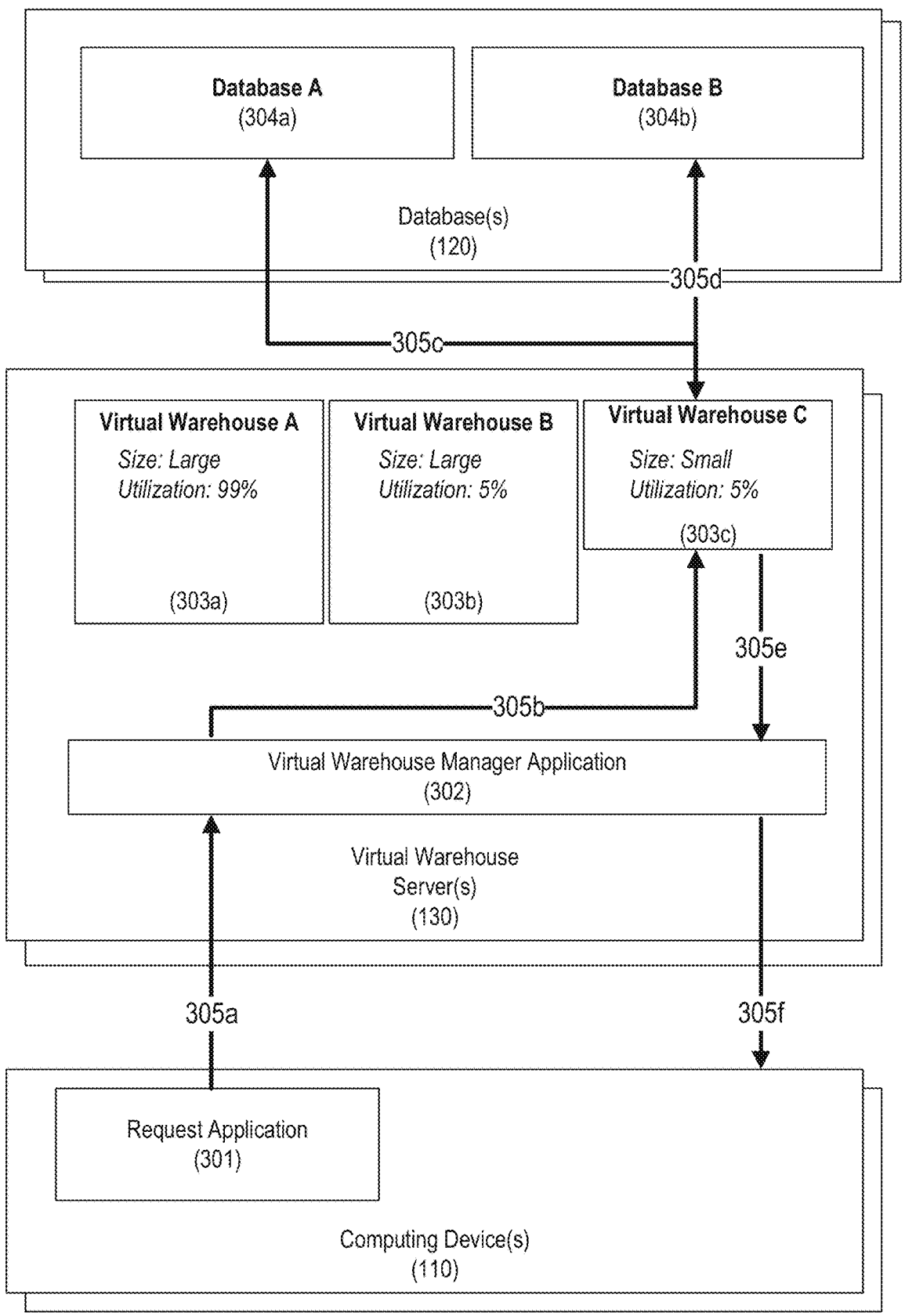
FIG. 3 depicts computing devices, virtual warehouse servers, and data warehouses working in conjunction to execute queries.

FIG. 3 shows a system comprising the computing devices 110, the virtual warehouse servers 130, and the data warehouses 120 of FIG. 1. FIG. 3 may depict all or portions of a system configured according to the Snowflake architecture or a similar architecture permitting use of one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by a virtual warehouse as a service platform organization, such as Snowflake Inc., of San Mateo, CA.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month"). The request for the query may comprise query text, such as some alphanumeric string that is usable to identify data to collect from the databases 120 (e.g., an asterisk for all data, "SELECT * from TABLE_NAME," or the like).

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Broadly, such quantities of computing resources may be referred to via "t-shirt sizes," such that one virtual warehouse may be referred to as "large," whereas another may be referred to as "small." Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to execute queries, collect results, and provide those results.

Virtual warehouses, such as the virtual warehouse A 303a, the virtual warehouse B 303b, and/or the virtual warehouse C 303c, may be resized based on a schedule. For example, a single virtual warehouse (e.g., the virtual warehouse A 303a) may be resized based on a schedule specific to that virtual warehouse (and/or a group of virtual warehouses) such that it is larger during business hours (e.g., 9:00 AM to 5:00 PM) as compared to other hours. Such a schedule may be defined by an administrator, may be based on a use pattern specific to the virtual warehouse, and/or may be based on a pattern of activity, by one or more users, corresponding to one or more different virtual warehouses.

For example, the virtual warehouse manager application 302 may monitor use of virtual warehouses and determine that, during business hours, the virtual warehouses are used more frequently. Based on such a determination, the virtual warehouse manager application 302 may configure one or more virtual warehouses with a schedule that causes those one or more virtual warehouses to be larger during business hours and smaller during non-business hours. This may advantageously save money for an organization: by dynamically scaling the size of virtual warehouses, needlessly large (and thereby needlessly expensive) virtual warehouses need not be maintained.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304b, need not be the same: for example, the data warehouse A 304a may have an entirely different format, may have entirely different schedules which affect their size at any given time, and may have an entirely different structure as compared to the data warehouse B 304b. For instance, the data warehouse A 304a may comprise a SQL database, whereas the data warehouse B 304b may comprise a file server which stores files according to the File Allocation Table (FAT) file system. As part of this process, the virtual warehouse C 303c may receive, store, and/or organize results from the data warehouses 120. For example, the virtual warehouse C 303c may receive query results from the data warehouse A 304a and the data warehouse B 304b, may store those results in memory, and then may encrypt those results for security purposes.

As part of step 305e, the virtual warehouse C 303c provides the collected results to the virtual warehouse manager application 302. Then, as part of step 305f, the virtual warehouse manager application 302 provides the results to one or more of the computing devices 110. This process is optional, as the virtual warehouse C 303c may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305a is reflected as an arrow directly leading from the request application 301 to one or more of the virtual warehouse servers 130, the request may in fact be routed through various other computing devices as part of the network 140. As another example, the query process reflected in step 305c and step 305d may involve a plurality of different transmissions between the virtual warehouse C 303c and the data warehouses 120.

Figure 4:
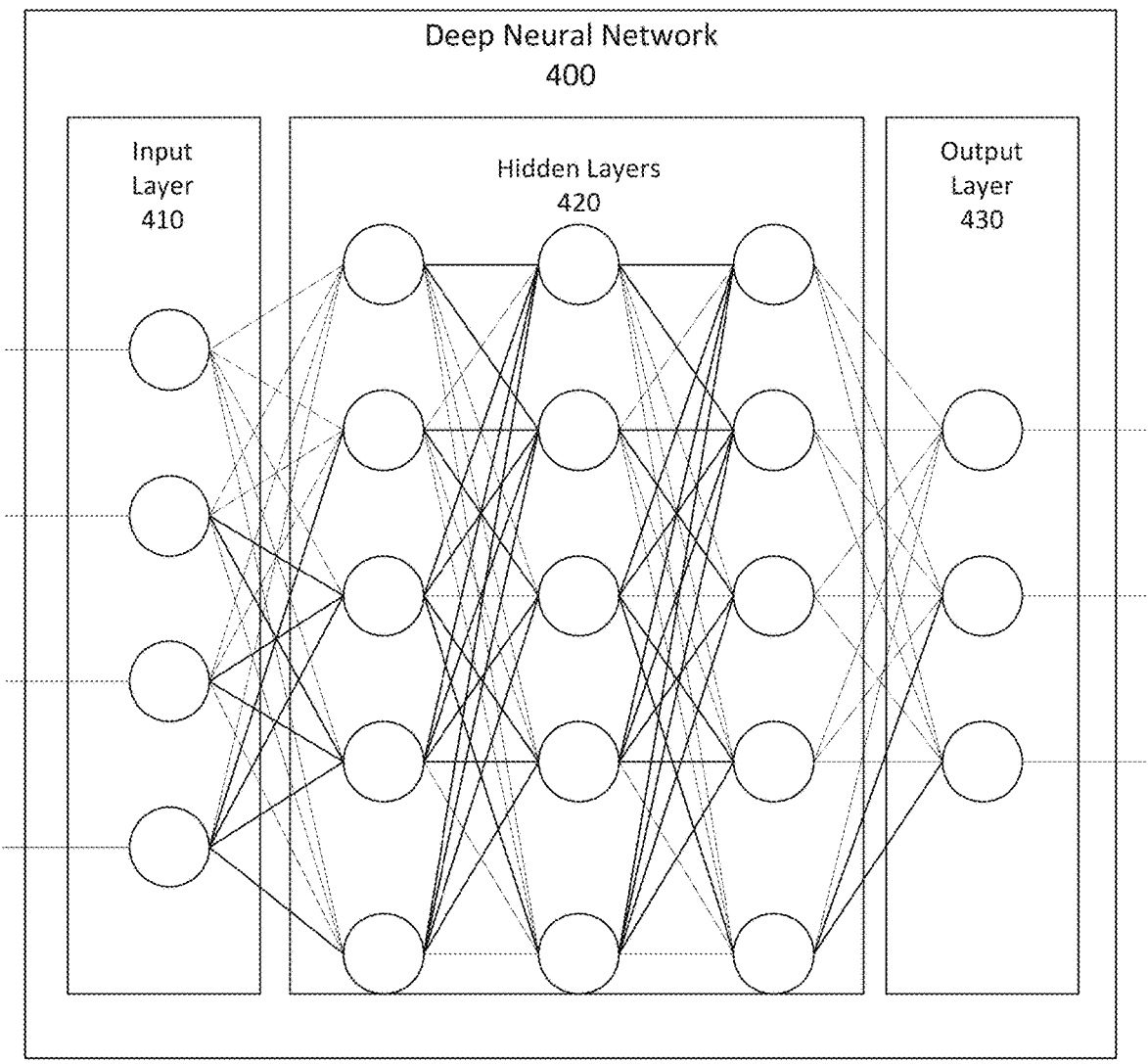
FIG. 4 depicts an example of deep neural network architecture for a model according to one or more aspects of the disclosure.

FIG. 4 depicts an example of deep neural network architecture 400. The architecture depicted in FIG. 4 need not be performed on a single computing device, and may be performed by, e.g., a plurality of computers (e.g., any one of the devices depicted in FIG. 1 or FIG. 2). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 410, one or more hidden layers 420, and an output layer 430. A deep neural network, as used herein, may be an artificial network that has more than one hidden layer. Illustrated network architecture 400 is depicted with three hidden layers, and thus may be considered a deep neural network. The number of hidden layers employed in the deep neural network architecture 400 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Discussion will now turn to a process which may be performed, by a computing device, to use machine learning to simulate changes to virtual warehouse configurations without access to data stored by corresponding virtual warehouses. As already indicated above, this may operate to allow a third party to recommend changes to virtual warehouses even when the data accessible via those virtual warehouses and/or query text provided to those virtual warehouses is not available (due to, e.g., privacy concerns).

Figure 5:
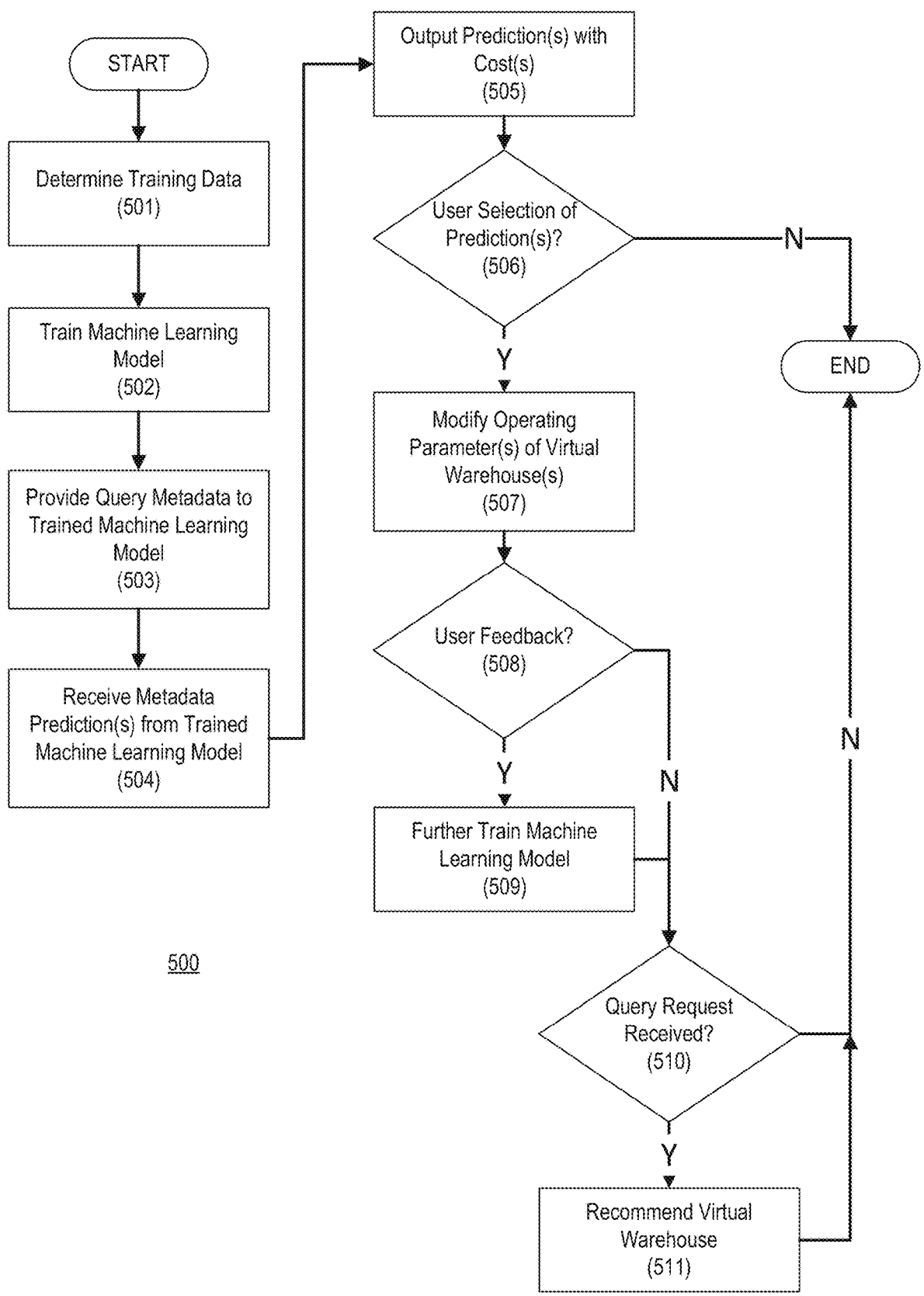
FIG. 5 depicts a flow chart involving steps for using machine learning to simulate changes to operating parameters of virtual warehouses.

FIG. 5 depicts a flowchart with steps of a method 500 which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 5. The steps depicted in FIG. 5 may operate on a Snowflake environment or other virtual warehouse environment, such that they may be performed by a computing device within or external to such an environment. For example, the steps depicted in FIG. 5 may be performed on a user device external to a preexisting virtual warehouse environment.

Step 501 through step 502 describe a process whereby a trained machine learning model might be generated. As will be described with respect to these steps, a machine learning model might be trained to simulate operating parameter changes and predict virtual warehouse query performance metrics. Moreover, as will be described with respect to later steps, this generated trained machine learning model may be usable to provide users various predictions of the effect (e.g., in terms of query execution time, cost, and the like) of configuration changes to virtual warehouses.

In step 501, a computing device may determine training data. Training data may comprise data usable to train a machine learning model to, e.g., predict an effect of operating parameter changes on virtual warehouse performance metrics. The training data may comprise performance metrics of queries conducted with respect to various virtual warehouses. For example, the computing device may receive first performance metrics of one or more first queries executed by one or more first virtual warehouses. Such performance metrics might indicate the size of various virtual warehouses, the execution time of various queries to those virtual warehouses, the time(s) of the queries to those virtual warehouses, the cost(s) associated with such queries to those virtual warehouses, and the like. An example of such performance metrics is discussed below with respect to FIG. 7A. That said, in some circumstances, the performance metrics might not comprise the query text of the queries submitted to those virtual warehouses and/or any information that might be usable to derive information stored by databases associated with those virtual warehouses. After all, for instance, such query text might contain confidential and/or otherwise sensitive information.

In step 502, the computing device may train a machine learning model using the training data. The machine learning model may be implemented using the deep neural network architecture 400 described with respect to FIG. 4. For example, the computing device may generate a trained machine learning model by training, using the first performance metrics, a machine learning model to simulate operating parameter changes and predict virtual warehouse query performance metrics. Training the machine learning model may comprise modifying, based on the first performance metrics, one or more weights of an artificial neural network, such as the deep neural network architecture 400. For instance, one or more of the weights of the nodes of the hidden layers 420 may be modified based on training data such as the first performance metrics.

The machine learning model may be trained based on performance metrics from queries to a variety of virtual warehouses. For instance, the training data might comprise performance metrics corresponding to queries to a first virtual warehouse, but the input data and output data of the trained machine learning model (discussed further below with respect to, e.g., step 503 and step 504) might be associated with entirely different virtual warehouses. Stated more simply, the virtual warehouses used for training might be different than the virtual warehouses analyzed using the trained machine learning model. That said, where possible (e.g., where performance metrics are available), the machine learning model might be trained based on past performance metrics of the virtual warehouse associated with the input data and/or the output data (e.g., with respect to steps 503 and 504). For example, the computing device may further train the machine learning model based on third performance metrics of one or more third queries executed by the one or more second virtual warehouses.

Step 503 through step 507 describe a process whereby performance metrics of queries to one or more virtual warehouses is provided to the aforementioned trained machine learning model and, based on output from that trained machine learning model that simulates various configuration changes to those one or more virtual warehouses, a user is provided the opportunity to automatically modify operating parameters of those one or more virtual warehouses.

In step 503, the computing device may provide query performance metrics to the trained machine learning model. The query performance metrics may correspond to queries previously submitted (e.g., over some period of time) to one or more virtual warehouses. For example, the computing device may provide, as input to the trained machine learning model, second performance metrics of one or more second queries executed by one or more second virtual warehouses different from the one or more first virtual warehouses. As was the case with the performance metrics used to train the machine learning model, the performance metrics input in step 503 might indicate the size of various virtual warehouses, the execution time of various queries to those virtual warehouses, the time(s) of the queries to those virtual warehouses, the cost(s) associated with such queries to those virtual warehouses, and the like.

As part of providing input to the trained machine learning model, the computing device may provide, to the trained machine learning model, one or more indications of configuration changes to a virtual warehouse. In this manner, the trained machine learning model might be prompted to specifically explore certain types of configuration changes to a virtual warehouse (e.g., changes to size, changes to schedule, changes to a number of virtual warehouses). For example, the computing device may receive, via the user interface, a selection of a first configuration (e.g., a first size, a first schedule) and provide an indication of that first configuration to the trained machine learning model (e.g., as part of the data provided in step 503). In that example, the trained machine learning model might thereby be prompted to evaluate performance metric predictions specifically associated with the first configuration rather than, e.g., other changes to other configurations.

In step 504, the computing device may receive output from the trained machine learning model. For example, the computing device may receive performance metric predictions from the trained machine learning model. Such performance metric predictions may comprise predictions relating to the impact of various configuration changes on performance metrics that might result from queries submitted to virtual warehouses. For example, the computing device may receive, as output from the trained machine learning model, data indicating first performance metric predictions corresponding to a first configuration for an operating parameter of at least one of the one or more second virtual warehouses and second performance metric predictions corresponding to a second configuration for the operating parameter of the at least one of the one or more second virtual warehouses. The output may suggest that increasing the size of a virtual warehouse makes queries complete faster and/or might suggest that increasing the number of virtual warehouses increases the cost of conducting queries over a month.

In step 505, the computing device may output the predictions from step 503 along with, e.g., corresponding costs. This output might be in a user interface, such that users might select to (or not to) modify configuration(s) of virtual warehouse(s). For example, the computing device may cause display, in a user interface, of a first predicted cost based on the first performance metric predictions and associated with the first configuration and a second predicted cost based on the second performance metric predictions and associated with the second configuration. An example of such output is discussed below with respect to FIG. 6.

The corresponding costs may be determined and/or output in a variety of ways. In virtual warehouse services, costs are often a function of warehouse size, query utilization, time, and similar factors. As such, the corresponding costs may be determined using a formula based on the predicted output from the trained machine learning model in step 504. The corresponding costs may additionally and/or alternatively be determined by analyzing historical costs of the virtual warehouses. The costs may be displayed in a manner that indicates a current cost of the current configuration of one or more virtual warehouses as well as predicted cost(s) associated with changes to that current configuration. For instance, the computing device might indicate the current cost per month of a certain configuration, and indicate savings that might be applicable if the configuration is changed.

In step 506, the computing device may determine whether it has received a user selection of one or more of the predictions output in step 505. For example, a user might provide, via the user interface described above with respect to step 505, an indication that they want to adopt changes indicated by the predictions from step 503. For instance, the computing device may receive, via the user interface, a selection of an option corresponding to the first configuration. An example of such a user interface is discussed below with respect to FIG. 6. In such a circumstance, the method 500 may proceed to step 507. If the computing device does receive such a user selection, the method 500 proceeds to step 507. Otherwise, if a user selection is not received, the method 500 ends.

In step 507, the computing device may modify one or more operating parameters of one or more virtual warehouses. This process may include changing a size of one or more virtual warehouses, a schedule of one or more virtual warehouses, an availability of one or more virtual warehouses, rules for using one or more virtual warehouses, a quantity of the one or more virtual warehouses, or the like. For example, the computing device may modify, based on the selection, the operating parameter of the at least one of the one or more second virtual warehouses. To effectuate a modification to the one or more virtual warehouses, instructions may be transmitted to the virtual warehouse servers 130 (e.g., the virtual warehouse manager application 302) to modify the one or more virtual warehouses.

Modifying the one or more operating parameters of the one or more virtual warehouses may be performed in a variety of ways. The computing device may modify a size of the one or more second virtual warehouses. For example, the computing device may transmit, to the virtual warehouse manager application 302, instructions that cause a virtual warehouse to be changed from a small size to a large size. The computing device may additionally and/or alternatively modify a schedule of the one or more second virtual warehouses. For example, the computing device may transmit, to the virtual warehouse manager application 302, instructions that cause a virtual warehouse to be changed from a 24/7 schedule to a schedule that disables the virtual warehouse during a particular period of time (e.g., after business hours). The computing device may additionally and/or alternatively prevent the one or more second virtual warehouses from executing a query. For example, the computing device may transmit, to the virtual warehouse manager application 302, instructions that cause a virtual warehouse to prevent certain queries (e.g., queries of a certain size, from a certain set of users, or the like) from being executed during certain periods of time. The computing device may additionally and/or alternatively modify a minimum number of clusters of the one or more second virtual warehouses and/or may modify a maximum number of clusters of the one or more second virtual warehouses. As virtual warehouses may comprise a plurality of compute clusters, such an approach might thereby increase or decrease the processing capabilities of a particular virtual warehouse. For example, the computing device may increase the number of compute clusters available to the one or more second virtual warehouses to increase the speed of the one or more second virtual warehouses (albeit at additional financial cost). The computing device may additionally and/or alternatively modify an auto suspend time of the one or more second virtual warehouses. For example, the computing device might modify a setting of a virtual warehouse such that it auto-suspends after a two-minute period of inactivity rather than auto-suspending after a five-minute period of inactivity. The computing device may additionally and/or alternatively modify a statement timeout of the one or more second virtual warehouses. For example, the computing device may modify a setting that causes a virtual warehouse to timeout after a query has executed for longer than one hour, rather than timing out after a query has executed for two days. The computing device may additionally and/or alternatively modify a query acceleration setting of the one or more second virtual warehouses. A query acceleration service setting can accelerate parts of a query workload of a virtual warehouse by offloading portions of query processing work to shared compute resources, thereby reducing the impact of outlier (e.g., unexpectedly large and/or complex) queries. In turn, the computing device may modify such a setting for a virtual warehouse so that it is better able to handle unpredictably large and/or complex workloads. The computing device may additionally and/or alternatively modify a setting that controls whether the one or more second virtual warehouses are optimized for a specific developer framework or API, such as, for example, SnowPark. The SnowPark API by Snowflake Inc. of San Mateo, CA provides a library that, among other benefits, allows developers to write code in any of a plurality of programming languages and run that code directly on the Snowflake platform. In turn, the computing device may modify such a setting to allow a greater variety of code to run with respect to a particular virtual warehouse.

In addition to and/or alternative to the modification discussed with respect to step 507, the overall quantity of virtual warehouses may be modified. For example, the computing device may instantiate, based on the selection, an additional virtual warehouse. To perform such an instantiation, the computing device may transmit, to the virtual warehouse manager application 302, instructions that cause a new virtual warehouse to be instantiated. As another example, the computing device may disable, based on the selection, one or more virtual warehouses. As with instantiation, this might be performed by transmitting instructions to the virtual warehouse manager application 302.

Step 508 and step 509 describe a process whereby user feedback regarding modifications to virtual warehouses may be used to further train the trained machine learning model. This process might implement a feedback loop, whereby positive user feedback might help indicate positive changes to virtual warehouses that might reinforce the weights of the trained machine learning model, whereas negative user feedback might counsel for modification to one or more weights of the trained machine learning model.

In step 508, the computing device may determine whether it has received user feedback. For example, the computing device may receive, via the user interface and after the computing device modifies the operating parameters, user feedback. If such feedback is received, the method 500 proceeds to step 509. Otherwise, if user feedback is not received, the method 500 proceeds to step 510. The user feedback may indicate whether the user was satisfied with the changes to the virtual warehouses made in step 507. In some circumstances, the feedback might be subjective: a user might indicate that they liked the change for speed and/or cost reasons, but might not necessarily indicate which changes were particularly meaningful. Nonetheless, such feedback might be valuable because it may indicate whether the trained machine learning model provided useful output or not.

In step 509, the computing device may further train the machine learning model based on the user feedback discussed with respect to step 508. For example, the computing device may further train the machine learning model based on the user feedback. If the feedback received in step 508 is positive, the training may be reinforced; however, if the feedback received in step 508 is negative, one or more weights of the trained machine learning model may be modified.

Step 510 and step 511 describe a process whereby output from the trained machine learning model may be additionally used to recommend how to allocate queries to particular virtual warehouses. This may be useful where the virtual warehouse manager application 302, standing alone, might not efficiently allocate queries in a manner that improves the results (e.g., query speed, cost effectiveness) of queries.

In step 510, the computing device may determine whether it has received a query request. Such a query request may be the same or similar as the query requests described with respect to FIG. 3. For example, the computing device may receive, after the computing device modifies the operating parameters, an indication of a requested query. If such a query request is received, the method 500 proceeds to step 511. Otherwise, if a query request is not received, the method 500 ends.

In step 511, the computing device may recommend a virtual warehouse for executing the query request received in step 510. In this manner, the computing device might recommend use of a particularly efficient virtual warehouse, a newly-instantiated virtual warehouse, a newly-resized virtual warehouse, or the like. For example, the computing device may output a recommended virtual warehouse of the one or more second virtual warehouses for executing the requested query.

FIG. 6 provides an example of a user interface 600 that comprises a status quo option 601a, a first virtual warehouse configuration change option 601b, and a second virtual warehouse configuration change option 601c. The user interface 600 might be output to a user as part of step 505 of FIG. 5, such that the options of the user interface 600 might have been generated based on the performance metric predictions discussed with respect to step 504 of FIG. 5. As shown in FIG. 6, the status quo option 601a indicates the current operating configuration of two different virtual warehouses as well as a total cost ($30/hr.) of that configuration. In turn, the first virtual warehouse configuration change option 601b indicates that changing a first virtual warehouse to a medium size and configuring a second virtual warehouse to turn off at 6 PM would result in a total cost of $25/hr. (that is, a $5/hr. savings) and would slightly harm the average query time of the first virtual warehouse. Moreover, the second virtual warehouse configuration change option 601c indicates that changing the first virtual warehouse to an "XL" size would significantly improve the average query time of the first virtual warehouse but would result in a total cost of $40/hr.—that is, an additional $10/hr. cost.

FIG. 7A shows illustrative query performance metrics 700 that comprise a query ID column 701a, a time elapsed column 701b, a virtual warehouse identifier column 701c, and a virtual warehouse size column 701d. A first row 702a of the query performance metrics 700 indicates that a first query took twenty seconds to complete and was executed on a virtual warehouse called "VW2" having a medium size. A second row 702b of the query performance metrics 700 indicates that a second query took fifteen seconds to complete and was executed on a virtual warehouse called "VW1" having a large size. A third row 702c of the query performance metrics 700 indicates that a third query took thirty seconds to complete and was executed on a virtual warehouse called "VW2" having a medium size.

As described with respect to step 503 of FIG. 5, query performance metrics, such as the query performance metrics 700 of FIG. 7, might be provided as input to a trained machine learning model. In such a circumstance, the trained machine learning model might provide output (e.g., as will be further illustrated below with respect to FIG. 7B). Additionally and/or alternatively, as described above with respect to step 501 and 502 of FIG. 5, query performance metrics, such as the query performance metrics 700 of FIG. 7, may be used to train a machine learning model. For instance, the query performance metrics 700 might have been generated using synthetic data and/or based on queries to real-world virtual warehouses.

The query performance metrics 700 also illustrates how performance metrics might not necessarily contain information about query text or the actual data queried by a virtual warehouse. In particular, the query performance metrics 700 might not contain any information about what type of data is accessed by the virtual warehouse, the actual queries made to the virtual warehouse, or the like. This aids in security, particularly in circumstances where data and/or query text might be sensitive.

FIG. 7B depicts an illustrative performance metrics prediction 703 that might be output from a trained machine learning model as part of, for example, step 504 of FIG. 5. The query ID column 701a, the time elapsed column 701b, the virtual warehouse identifier column 701c, and the virtual warehouse size column 701d may be the same or similar as discussed with respect to FIG. 7A. That said, relative to the query performance metrics 700 of FIG. 7A, the performance metrics prediction 703 shows some predicted differences based on a change in the size of a virtual warehouse called "VW2." Specifically, by changing the virtual warehouse "VW2" to a small size, the performance metrics prediction 703 indicates in a first row 702d that the time elapsed for the first query would increase to thirty seconds and indicates in a third row 702f that the time elapsed for the third query would increase to sixty seconds. That said, because the virtual warehouse "VW1" has not changed, a second row 702e of the performance metrics prediction 703 is identical to the second row 702b of FIG. 7A.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device configured to use machine learning to simulate changes to virtual warehouse configurations without access to data stored by corresponding virtual warehouses, the computing device comprising:
    one or more processors; and
    memory storing instructions that, when executed by the one or more processors, cause the computing device to:
        collect first performance metrics of one or more first queries during execution, by one or more first virtual warehouses, of the one or more first queries, wherein each of the one or more first virtual warehouses comprises a respective set of computing resources configured to:
            execute one or more queries with respect to at least a portion of a plurality of data warehouses,
            collect results from the one or more queries, and
            provide access to the collected results;
        generate a trained machine learning model by training, using the first performance metrics, an artificial neural network comprising a plurality of nodes to simulate operating parameter changes and predict virtual warehouse query performance metrics, wherein training the artificial neural network comprises modifying, based on the first performance metrics, one or more weights of the plurality of nodes;
        collect second performance metrics of one or more second queries during execution, by one or more second virtual warehouses different from the one or more first virtual warehouses, of the one or more second queries;
        provide, as input to the trained machine learning model, the second performance metrics;
        receive, as output from the trained machine learning model and in response to the input to the trained machine learning model, data indicating:
            first performance metric predictions corresponding to a first configuration for an operating parameter of at least one of the one or more second virtual warehouses; and
            second performance metric predictions corresponding to a second configuration for the operating parameter of the at least one of the one or more second virtual warehouses;
        cause display, in an interface, of:
            a first predicted cost based on the first performance metric predictions and associated with the first configuration, and
            a second predicted cost based on the second performance metric predictions and associated with the second configuration;
        receive, via the interface, a selection of an option corresponding to the first configuration;
        modify, based on the selection, the operating parameter of the at least one of the one or more second virtual warehouses by transmitting, to a virtual warehouse management application, instructions that prevent the one or more second virtual warehouses from executing one or more types of queries during a particular period of time defined by a schedule;
        receive, via a second interface and after modification of the operating parameter, input indicating feedback corresponding to the at least one of the one or more second virtual warehouses; and
        further train, based on the input and based on the selection, the trained machine learning model by modifying, based on the feedback corresponding to the at least one of the one or more second virtual warehouses, at least one weight of the one or more weights of the plurality of nodes.

2. The computing device of claim 1, wherein the instructions, when executed by the one or more processors, cause the computing device to modify the operating parameter of the at least one of the one or more second virtual warehouses by causing the computing device to:
    modify one or more of:
        a size of the one or more second virtual warehouses;
        a schedule of the one or more second virtual warehouses;
        a minimum number of clusters of the one or more second virtual warehouses;
        a maximum number of clusters of the one or more second virtual warehouses;
        an auto suspend time of the one or more second virtual warehouses;

a statement timeout of the one or more second virtual warehouses;
a query acceleration setting of the one or more second virtual warehouses; or
a setting that controls whether the one or more second virtual warehouses are optimized for an application programming interface (API).

3. The computing device of claim 1, wherein the one or more types of queries correspond to queries received from one or more users.

4. The computing device of claim 1, wherein the instructions, when executed by the one or more processors, cause the computing device to generate the trained machine learning model by causing the computing device to:
train the machine learning model based on third performance metrics of one or more third queries executed by the one or more second virtual warehouses.

5. The computing device of claim 1, wherein the feedback corresponds to a cost of the at least one of the one or more second virtual warehouses.

6. The computing device of claim 1, wherein the instructions, when executed by the one or more processors, cause the computing device to:
instantiate, based on the selection, an additional virtual warehouse.

7. The computing device of claim 1, wherein the instructions, when executed by the one or more processors, further cause the computing device to:
receive, after the computing device modifies the operating parameter, an indication of a requested query; and
output a recommended virtual warehouse of the one or more second virtual warehouses for executing the requested query.

8. The computing device of claim 1, wherein the instructions, when executed by the one or more processors, further cause the computing device to provide, as the input to the trained machine learning model, the second performance metrics by causing the computing device to:
receive, via the user interface, a selection of the first configuration, wherein the second performance metrics comprises an indication of the first configuration.

9. A method for using machine learning to simulate changes to virtual warehouse configurations without access to data stored by corresponding virtual warehouses, the method comprising:
collecting, by a computing device, first performance metrics of one or more first queries during execution, by one or more first virtual warehouses, of the one or more first queries, wherein each of the one or more first virtual warehouses comprises a respective set of computing resources configured to:
execute one or more queries with respect to at least a portion of a plurality of data warehouses,
collect results from the one or more queries, and
provide access to the collected results;
generating, by the computing device, a trained machine learning model by training, using the first performance metrics, an artificial neural network comprising a plurality of nodes to simulate operating parameter changes and predict virtual warehouse query performance metrics, wherein training the artificial neural network comprises modifying, based on the first performance metrics, one or more weights of the plurality of nodes;
collecting second performance metrics of one or more second queries during execution, by one or more second virtual warehouses different from the one or more first virtual warehouses, of the one or more second queries;
providing, by the computing device and as input to the trained machine learning model, the second performance metrics;
receiving, by the computing device and as output from the trained machine learning model in response to the input to the trained machine learning model, data indicating:
first performance metric predictions corresponding to a first configuration for an operating parameter of at least one of the one or more second virtual warehouses; and
second performance metric predictions corresponding to a second configuration for the operating parameter of the at least one of the one or more second virtual warehouses;
causing display, in an interface, of:
a first predicted cost based on the first performance metric predictions and associated with the first configuration, and
a second predicted cost based on the second performance metric predictions and associated with the second configuration;
receiving, by the computing device and via the interface, a selection of an option corresponding to the first configuration;
modifying, by the computing device and based on the selection, the operating parameter of the at least one of the one or more second virtual warehouses by transmitting, to a virtual warehouse management application, instructions that prevent the one or more second virtual warehouses from executing one or more types of queries during a particular period of time defined by a schedule;
receiving, via a second user interface and after modification of the operating parameter, input indicating feedback corresponding to the at least one of the one or more second virtual warehouses; and
further training, based on the input and based on the selection, the trained machine learning model by modifying, based on the feedback corresponding to the at least one of the one or more second virtual warehouses, at least one weight of the one or more weights of the plurality of nodes.

10. The method of claim 9, wherein the modifying the operating parameter of the at least one of the one or more second virtual warehouses comprises:
modifying one or more of:
a size of the one or more second virtual warehouses;
a schedule of the one or more second virtual warehouses;
a minimum number of clusters of the one or more second virtual warehouses;
a maximum number of clusters of the one or more second virtual warehouses;
an auto suspend time of the one or more second virtual warehouses;
a statement timeout of the one or more second virtual warehouses;
a query acceleration setting of the one or more second virtual warehouses; or
a setting that controls whether the one or more second virtual warehouses are optimized for an application programming interface (API).

11. The method of claim 9, wherein the one or more types of queries correspond to queries received from one or more users.

12. The method of claim 9, wherein generating the trained machine learning model comprises:
training the machine learning model based on third performance metrics of one or more third queries executed by the one or more second virtual warehouses.

13. The method of claim 9, wherein the user-feedback corresponds to a cost of the at least one of the one or more second virtual warehouses.

14. The method of claim 9, further comprising:
instantiating, based on the selection, an additional virtual warehouse.

15. One or more non-transitory computer-readable media storing instructions configured to use machine learning to simulate changes to virtual warehouse configurations without access to data stored by corresponding virtual warehouses, wherein the instructions, when executed by one or more processors, cause a computing device to:
collect first performance metrics of one or more first queries during execution, by one or more first virtual warehouses, of the one or more first queries, wherein each of the one or more first virtual warehouses comprises a respective set of computing resources configured to:
execute one or more queries with respect to at least a portion of a plurality of data warehouses,
collect results from the one or more queries, and
provide access to the collected results;
generate a trained machine learning model by training, using the first performance metrics, an artificial neural network comprising a plurality of nodes to simulate operating parameter changes and predict virtual warehouse query performance metrics, wherein training the artificial neural network comprises modifying, based on the first performance metrics, one or more weights of the plurality of nodes;
collect second performance metrics of one or more second queries during execution, by one or more second virtual warehouses different from the one or more first virtual warehouses, of the one or more second queries;
provide, as input to the trained machine learning model, the second performance metrics;
receive, as output from the trained machine learning model and in response to the input to the trained machine learning model, data indicating:
first performance metric predictions corresponding to a first configuration for an operating parameter of at least one of the one or more second virtual warehouses; and
second performance metric predictions corresponding to a second configuration for the operating parameter of the at least one of the one or more second virtual warehouses;
cause display, in an interface, of:
a first predicted cost based on the first performance metric predictions and associated with the first configuration, and
a second predicted cost based on the second performance metric predictions and associated with the second configuration;
receive, via the interface, a selection of an option corresponding to the first configuration;
modify, based on the selection, the operating parameter of the at least one of the one or more second virtual warehouses by transmitting, to a virtual warehouse management application, instructions that prevent the one or more second virtual warehouses from executing one or more types of queries during a particular period of time defined by a schedule;
receive, via a second interface and after modification of the operating parameter, input indicating feedback corresponding to the at least one of the one or more second virtual warehouses; and
further train, based on the input and based on the selection, the trained machine learning model by modifying, based on the feedback corresponding to the at least one of the one or more second virtual warehouses, at least one weight of the one or more weights of the plurality of nodes.

16. The one or more non-transitory computer-readable media of claim 15, wherein the instructions, when executed by the one or more processors, cause the computing device to modify the operating parameter of the at least one of the one or more second virtual warehouses by causing the computing device to:
modify one or more of:
a size of the one or more second virtual warehouses;
a schedule of the one or more second virtual warehouses;
a minimum number of clusters of the one or more second virtual warehouses;
a maximum number of clusters of the one or more second virtual warehouses;
an auto suspend time of the one or more second virtual warehouses;
a statement timeout of the one or more second virtual warehouses;
a query acceleration setting of the one or more second virtual warehouses; or
a setting that controls whether the one or more second virtual warehouses are optimized for an application programming interface (API).

17. The one or more non-transitory computer-readable media of claim 15, wherein the one or more types of queries correspond to queries received from one or more users.

18. The one or more non-transitory computer-readable media of claim 15, wherein the instructions, when executed by the one or more processors, cause the computing device to generate the trained machine learning model by causing the computing device to:
train the machine learning model based on third performance metrics of one or more third queries executed by the one or more second virtual warehouses.

19. The one or more non-transitory computer-readable media of claim 15, wherein the user feedback corresponds to a cost of the at least one of the one or more second virtual warehouses.

20. The one or more non-transitory computer-readable media of claim 15, wherein the instructions, when executed by the one or more processors, cause the computing device to:
instantiate, based on the selection, an additional virtual warehouse.

* * * * *